United States Patent
Sceats et al.

(10) Patent No.: US 9,505,998 B2
(45) Date of Patent: Nov. 29, 2016

(54) SYSTEM AND METHOD FOR PROCESSING AN INPUT FUEL GAS AND STEAM TO PRODUCE CARBON DIOXIDE AND AN OUTPUT FUEL GAS

(71) Applicant: Calix Limited, Pymble (AU)

(72) Inventors: Mark Geoffrey Sceats, Pyrmont (AU); Julian Westley Dinsdale, Mount Kuring-gai (AU)

(73) Assignee: Calix Limited, Pymble (AU)

( * ) Notice: Subject to any disclaimer, the term of this patent is extended or adjusted under 35 U.S.C. 154(b) by 15 days.

(21) Appl. No.: 14/803,462

(22) Filed: Jul. 20, 2015

(65) Prior Publication Data
US 2015/0322357 A1 Nov. 12, 2015

Related U.S. Application Data (62) Division of application No. 13/503,838, filed as application No. PCT/AU2010/001096 on Aug. 25, 2010, now Pat. No. 9,150,807.

(30) Foreign Application Priority Data

| Oct. 24, 2009 | (AU) | 2009905196 |
| Feb. 8, 2010 | (AU) | 2010900488 |
| Mar. 16, 2010 | (AU) | 2010901062 |

(51) Int. Cl.
*B01J 8/00* (2006.01)
*B01D 53/62* (2006.01)
(Continued)

(52) U.S. Cl.
CPC ............ *C10K 1/005* (2013.01); *B01D 53/62* (2013.01); *B01J 20/041* (2013.01); *B01J 20/28004* (2013.01); *B01J 20/3204* (2013.01); *B01J 20/3433* (2013.01); *B01J 20/3483* (2013.01);
(Continued)

(58) Field of Classification Search
CPC combination set(s) only.
See application file for complete search history.

(56) References Cited

U.S. PATENT DOCUMENTS

| 1,938,202 A | 12/1933 | Williams |
| 2,538,235 A | 1/1951 | Coffey |

(Continued)

FOREIGN PATENT DOCUMENTS

| WO | 2006113673 A2 | 10/2006 |
| WO | 2009137886 A1 | 11/2009 |

OTHER PUBLICATIONS

"International Preliminary Report on Patentability issued in International Application No. PCT/AU2010/001096", Apr. 24, 2012.
(Continued)

*Primary Examiner* — Kaity Handal
(74) *Attorney, Agent, or Firm* — Kaplan Breyer Schwarz & Ottesen, LLP (57) ABSTRACT

A method and system for processing an input fuel gas and steam to produce separate $CO_2$ and output fuel gas streams. The method comprises the steps of using a decarbonizer segment for reacting at least a solid sorbent with the fuel gas and steam to remove carbon from the input fuel gas and to produce the output fuel gas stream in an exhaust gas from the decarbonizer; using a calciner segment for reacting the solid sorbent from the decarbonizer segment therein to release the $CO_2$ into the $CO_2$ gas stream; wherein $CO_2$ partial pressures and temperatures in the decarbonizer and calciner segments respectively are controlled such that the temperature in the decarbonizer segment is higher than the temperature in the calciner.

19 Claims, 6 Drawing Sheets

(51) Int. Cl.
  *C10K 1/00* (2006.01)
  *C10K 3/00* (2006.01)
  *C10L 3/10* (2006.01)
  *B01J 20/04* (2006.01)
  *B01J 20/28* (2006.01)
  *B01J 20/32* (2006.01)
  *B01J 20/34* (2006.01)
  *C01B 3/16* (2006.01)
  *C01B 3/38* (2006.01)
  *C01B 31/20* (2006.01)
  *C10K 1/26* (2006.01)
  *C10K 1/32* (2006.01)
  *C10K 1/34* (2006.01)
  *C10K 3/04* (2006.01)
  *C10L 3/08* (2006.01)

(52) U.S. Cl.
  CPC ............... *C01B 3/16* (2013.01); *C01B 3/384* (2013.01); *C01B 31/20* (2013.01); *C10K 1/26* (2013.01); *C10K 1/32* (2013.01); *C10K 1/34* (2013.01); *C10K 3/00* (2013.01); *C10K 3/04* (2013.01); *C10L 3/08* (2013.01); *C10L 3/104* (2013.01); *B01D 2251/402* (2013.01); *B01D 2251/404* (2013.01); *B01D 2251/602* (2013.01); *B01D 2253/1124* (2013.01); *B01D 2253/304* (2013.01); *B01D 2257/504* (2013.01); *B01J 2220/42* (2013.01); *C01B 2203/0233* (2013.01); *C01B 2203/0425* (2013.01); *C01B 2203/0475* (2013.01); *C01B 2203/0822* (2013.01); *C01B 2203/0827* (2013.01); *C01B 2203/1241* (2013.01); *C01B 2203/84* (2013.01); *C01B 2203/86* (2013.01); *C10L 2290/12* (2013.01); *C10L 2290/542* (2013.01); *Y02C 10/04* (2013.01); *Y02C 10/08* (2013.01); *Y02P 20/128* (2015.11); *Y02P 20/152* (2015.11); *Y02P 30/30* (2015.11)

(56) References Cited

U.S. PATENT DOCUMENTS

| | | | |
|---|---|---|---|
| 3,725,529 | A | 4/1973 | Giammarco et al. |
| 4,431,622 | A | 2/1984 | Moss |
| 5,520,894 | A | 5/1996 | Heesink et al. |
| 2003/0035770 | A1 | 2/2003 | Cole |
| 2005/0060985 | A1 | 3/2005 | Abanades Garcia et al. |
| 2008/0233029 | A1 | 9/2008 | Fan et al. |
| 2008/0253956 | A1 | 10/2008 | Rossi |

OTHER PUBLICATIONS

"International Search Report issued in International Application No. PCT/AU2010/001096", Nov. 16, 2010.

"Notice of Allowance issued in U.S. Appl. No. 13/503,838", Jul. 2, 2015.

"Non-Final Office Action issued in U.S. Appl. No. 13/503,838", May 18, 2015.

SYSTEM AND METHOD FOR PROCESSING AN INPUT FUEL GAS AND STEAM TO PRODUCE CARBON DIOXIDE AND AN OUTPUT FUEL GAS

This application is a Divisional of U.S. patent Ser. No. 13/503,838, filed on Apr. 24, 2012, now U.S. Pat. No. 9,150,807, issued on Oct. 6, 2015.

Australian Patent Application Nos. AU2009905196 filed on Oct. 24, 2009, AU2010900488 filed on Feb. 8, 2010, and AU2010901062 filed on Mar. 16, 2010, are incorporated herein by reference.

FIELD OF INVENTION

The present invention relates broadly to a system and method for processing an input fuel gas and steam to produce carbon dioxide and an output fuel gas in separate gas streams.

BACKGROUND

Industrial plants that consume large amounts of carbon fuels, such as power, cement and iron and steel plants, increasingly require flexibility in their operations associated with the volatility of the cost of fuels and the price of products, as well as the regulatory and market environment particularly associated with carbon emissions. In such cases there are benefits to be obtained from adopting a mix of fuels, such as fossil fuels of coal and natural gas, which attract emissions penalties, and biomass and waste which typically do not. There is a need for production processes that can interchange such fuels. Such a flexible fuel plant can operate in any of the regimes of (a) full carbon emissions from combustion of fossil fuels with no sequestration, with emissions penalties, (b) with negligible emissions from either combustion of fossil fuels with sequestration of carbon dioxide ($CO_2$) or combustion of non-fossil fuels without sequestration, with no emissions penalties (c) negative carbon emissions from combustion of non-fossil fuels with sequestration of $CO_2$, which may be a source of revenue with emissions trading schemes. The optimal operating conditions may change on the timescale of hours to days due to market variability in input and output prices, including those from carbon emissions. In addition, there may be an additional uncertainty in long term operating costs over the timescale of the lifetime of the industrial plant, potentially rendering the plant uneconomic, arising from changes to the regulatory environment for $CO_2$ emissions. In this environment, there is a need for a flexible approach to carbon capture in which the plant can operate in any of these regimes.

With the high capital cost of industrial processing plants, the need for flexibility in the use of the plant is particularly important. For example, an operator may have a choice of using fuel inputs, such as coals of various grades, natural gas (NG), biomass or waste. The operator may also benefit from a choice of derived fuel products, including Hydrogen, Synthetic Natural Gas (SNG), and a choice of whether or not to process the carbon dioxide for sequestration. There is a need for a flexible process that can use a variety of fuel inputs to produce a variety of fuel outputs with and without carbon capture. More specific examples are considered below.

One approach to reduce $CO_2$ emissions from the combustion of solid fuels such as coal, biomass and waste is pre-combustion carbon capture from Syngas produced by the partial oxidation of such solid fuels with steam and oxygen in a Partial Oxidising Gasifier. Syngas comprises the combustible gases hydrogen, carbon monoxide and smaller amounts of methane and other hydrocarbons. It also contains significant amounts of $CO_2$ and steam. In this approach, further $CO_2$ is generated by the Water-gas Shift reaction with steam, separated, compressed and sequestered, with the production of hydrogen as the fuel gas stream. This process is the basis of the Integrated Gasification Combined Cycle (IGCC) system for power generation. It is believed that this process, without $CO_2$ capture, has about the maximum efficiency for power generation. While the Partial Oxidising Gasifier technology is versatile with respect to the solid fuel source, decarbonation using pre-combustion capture technologies, such as the Benfield separation process and the Water Gas Shift reaction, incurs a significant energy penalty, and the costs of $CO_2$ capture are significant. In addition, hydrogen is difficult to transport and store, so that such a system must produce hydrogen on demand. Underground Coal Gasification produces Syngas directly from a coal stream.

In both cases, the gasification reaction occurs at high pressure, generally in excess of 20 bar, and the output temperature is controlled by quenching with water, but is optimally about 800-900 C, say 850 C before gas clean-up. In most commercial Partial Oxidising Gasifiers, pure oxygen is injected into the Gasifier. The compressed oxygen is extracted from the air in an Air Separation Unit. In other Partial Oxidising Gasifiers, compressed air is introduced directly into the gasifier, with the consequence that the Syngas also contains inert gases such as nitrogen and argon.

There is a need for a decarbonation technology that can decarbonise Syngas produced from any of these processes, to produce a decarbonised hydrogen fuel stream, with or without inert gases, and a separate carbon dioxide gas stream, with a low energy penalty.

Another gasifier approach is to hydrogasify the solid fuel with hydrogen, and often with steam, in a Hydrogasifier to produce a fuel gas which comprises combustible components methane, carbon monoxide and hydrogen, and smaller amounts of other hydrocarbons. This fuel gas stream, called herein Hydrogas, can be partially decarbonised to produce a hydrogen gas stream that is fed back into the Hydrogasifier, a methane rich gas stream, called Synthetic or Substitute Natural Gas (SNG), and a separate $CO_2$ stream for sequestration. SNG production is only a partial decarbonisation process, typically with about 50% decarbonisation, because the SNG carries about 50% of the initial carbon and the $CO_2$ the other amount. The decarbonation of Hydrogas removes carbon from CO and $CO_2$ in the Hydrogas, but not from methane, to ensure that the SNG meets the high Calorific Value specifications of NG. This partial decarbonation of Hydrogas can be achieved using established pre-combustion capture technologies, such as the Benfield or amine processes in conjunction with steam and the Water-Gas Shift reaction. However, this process incurs a significant energy penalty, so that the costs of $CO_2$ capture are significant. There is a need for a decarbonation technology that can partially decarbonise Hydrogas to produce a hydrogen stream, an SNG fuel stream, and a separate carbon dioxide gas stream, with a low energy penalty. Underground Coal Hydrogasification produces Hydrogas directly from a coal stream through the injection of hydrogen, with steam if required. This Hydrogas can be decarbonised as described above.

The reduction of emissions from the combustion of NG, and thus SNG, is required to further reduce the $CO_2$ emissions. Generally, the carbon emissions from combustion of NG/SNG is about 50% less of the $CO_2$ emitted from the combustion of a solid fuel per unit of thermal energy produced. Further reduction of $CO_2$ emissions from combustion of NG/SNG can be achieved by post-combustion carbon capture, for example using amine technology. Pre-combustion decarbonisation of NG/SNG can be achieved by steam reforming the NG/SNG to produce Syngas, and the Syngas fuel stream is then decarbonised as described above for Syngas from a Partial Oxidising Gasifier. This gives a hydrogen gas stream for combustion and a separate carbon dioxide stream for sequestration. The separate processing steps of Steam Reforming, Water-Gas Shifting and $CO_2$ capturing using, for example, the Benfield process, has a significant energy penalty. There is a need for a decarbonation technology that can decarbonise NG/SNG in a single reactor to produce a decarbonised hydrogen fuel stream and a separate carbon dioxide gas stream, with a low energy penalty.

For example, a power generator may have access to solid fuel from a nearby coal, biomass or waste resources to produce Syngas from a Partial Oxidising Gasifier, and also have access to NG from a gas pipeline or from coal stream extraction. In this case, it may be desirable to have the flexibility to decarbonise either the Syngas or the NG to give a continuous hydrogen gas stream for power generation.

In another example, the power generator has chosen to produce SNG from Hydrogas and may benefit from diverting excess production of SNG into the NG pipeline, if only to access the gas storage capabilities of typical gas distribution systems. This would allow the operation of the Hydrogasifier at its maximum capacity even if the demand for power is low. In this approach, it would be preferable for a single stage process in which the decarbonation process can be switched from production of hydrogen to production of SNG, or a separable mixture thereof. Such a system would desirably be controlled to meet the variable demand for power taking into account the market for SNG and $CO_2$.

A need therefore exists to provide a system and method for processing an input fuel gas of variable composition, such as Syngas, Hydrogas, NG, SNG or mixtures thereof with steam to produce an output fuel gas with a controlled composition and a separate $CO_2$ gas stream that seek to address at least one of the above mentioned problems.

SUMMARY

According to a first aspect of the present invention there is provided a system for processing an input fuel gas and steam to produce separate $CO_2$ and output fuel gas streams, the system comprising a decarboniser segment configured such that at least a solid sorbent reacts therein with the fuel gas and steam to remove carbon from the input fuel gas and to produce the output fuel gas stream in an exhaust gas from the decarboniser; a calciner segment configured such that the solid sorbent from the decarboniser segment reacts therein to release the carbon as $CO_2$ into the $CO_2$ gas stream; wherein the system is configured such that $CO_2$ partial pressures and temperatures in the decarboniser and calciner segments respectively are controlled such that the temperature in the decarboniser segment is higher than the temperature in the calciner segment such that heat is provided from the decarboniser to the calciner.

The decarboniser may be configured such that the steam reacts with carbon monoxide in the fuel gas, or produced from the fuel gas in the decarboniser, to produce $CO_2$ for adsorption by the solid sorbent.

The decarboniser may be configured such that the steam reacts with hydrocarbons in the fuel gas to produce either or both of the carbon monoxide and the $CO_2$.

The system may further comprise a heat exchanger unit for exchanging heat between the decarboniser and calciner segments; wherein heat provided from the decarboniser to the calciner is provided through the heat exchanging unit The output fuel gas stream may comprise hydrogen or methane.

The input fuel gas may comprise Syngas, Hydrogas, SNG, or NG.

A solid catalyst may be provided in the decarboniser segment to activate a reaction to produce the output fuel gas in the exhaust gas from the decarboniser.

The solid catalyst may be supported in the decarboniser segment, or mixed with the solid sorbent as separate particles, or incorporated into the solid sorbent.

The solid catalyst may comprise iron oxide.

The solid catalyst may be mixed with the solid sorbent, and a particle size of the solid catalyst may be larger than a particle size of the solid sorbent.

The particle size of the solid catalyst may be equal to or larger than about 150 micron, and the particle size of the solid sorbent is less than about 125 microns.

The system may further comprise a combustor for providing additional heat to the calciner segment.

The solid sorbent may comprise lime particles.

The lime particles may be in the range of about 20-200 microns and the temperatures at the exhausts of the calciner and decarboniser segments are in the range of about 700-950° C.

The system may further comprise a feed for feeding the output gas stream into a distribution network.

The methane gas distribution system may comprise an existing NG distribution network.

The NG distribution network may comprise transportation of liquified gas and low pressure gas delivery.

The gas distribution network may further be configured for delivering the output fuel gas in the form of methane to a reactor configured for pre-combustion removal of $CO_2$ from the methane.

The reactor configured for pre-combustion removal of $CO_2$ from the methane may generate separate Hydrogen and $CO_2$ streams from the methane.

The system may further comprising a feed for feeding the $CO_2$ gas stream into a $CO_2$ gas distribution network.

The $CO_2$ gas distribution network may be configured for delivery of the $CO_2$ gas stream for sequestration.

The $CO_2$ gas distribution network may be configured for receiving an additional feed from the or an Endex reactor configured for pre-combustion removal of $CO_2$.

According to a second aspect of the present invention there is provided a method for processing an input fuel gas and steam to produce separate $CO_2$ and output fuel gas streams, the method comprising the steps of using a decarboniser segment for reacting at least a solid sorbent reacts with the fuel gas and steam to remove carbon from the input fuel gas and to produce the output fuel gas stream in an exhaust gas from the decarboniser; using a calciner segment for reacting the solid sorbent from the decarboniser segment therein to release the $CO_2$ into the $CO_2$ gas stream; wherein $CO_2$ partial pressures and temperatures in the decarboniser and calciner segments respectively are controlled such that the temperature in the decarboniser segment is higher than the temperature in the calciner.

In the decarboniser, the steam may react with carbon monoxide in the fuel gas, or produced from the fuels gas in the decarboniser, to produce $CO_2$ for adsorption by the solid sorbent.

In the decarboniser, the steam may react with hydrocarbons in the fuel gas to produce either or both of the carbon monoxide and the $CO_2$.

The method may further comprise providing heat from the decarboniser to the calciner.

The output fuel gas stream may comprise hydrogen or methane.

The input fuel gas may comprise syngas, Hydrogas, SNG, or NG.

The method may further comprise providing a solid catalyst in the decarboniser segment to activate a reaction to produce the output fuel gas in the exhaust gas from the decarboniser.

The solid catalyst may comprise iron oxide.

A particle size of the solid catalyst may be larger than a particle size of the solid sorbent.

The particle size of the solid catalyst may be equal to or larger than about 150 micron, and the particle size of the solid sorbent is less than about 125 microns.

The method may further comprise using a combustor for providing additional heat to the calciner segment.

The solid sorbent may comprise lime particles.

The lime particles may be in the range of about 20-200 microns and the temperatures at the exhausts of the calciner and decarboniser segments are in the range of about 700-950° C.

The method may further comprise feeding the output gas stream into a distribution network.

The method may comprise transportation of liquified gas and low pressure gas delivery.

The method may further comprise delivering the output fuel gas stream in the form of methane to a reactor configured for pre-combustion removal of $CO_2$ from the methane.

The method may further comprise using the reactor configured for pre-combustion removal of $CO_2$ from the methane to generate separate Hydrogen and $CO_2$ streams from the methane.

The method may further comprise feeding the $CO_2$ gas stream into a $CO_2$ gas distribution network.

The method may further comprise using the gas distribution network for delivery of the $CO_2$ gas stream for sequestration.

The method may further comprise receiving an additional feed for the $CO_2$ gas distribution network from the or an Endex reactor configured for pre-combustion removal of $CO_2$.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1:
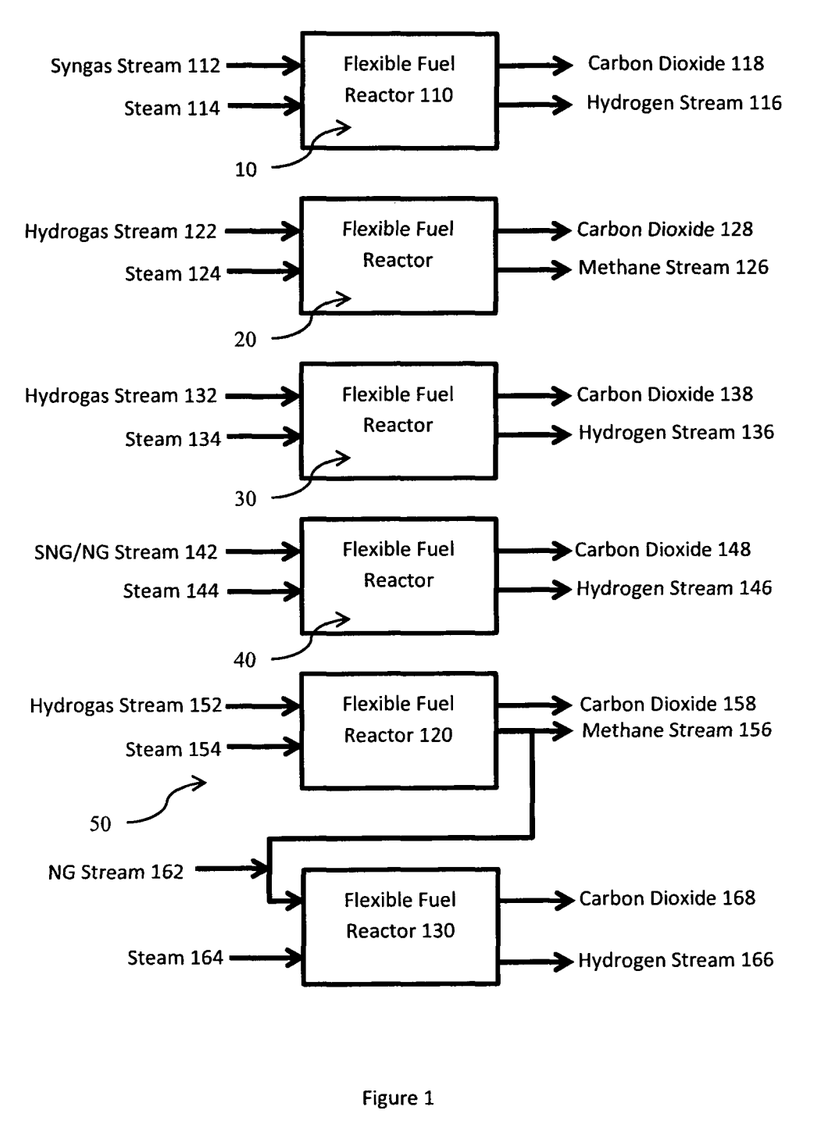
FIG. 1 shows a schematic drawing illustrating generic process flows for a Flexible Fuel Endex Reactor, according to an example embodiment.

A Flexible Fuel Endex reactor decarbonises an input fuel gas stream into an output fuel gas stream with a different composition of combustible gases and a carbon dioxide gas stream. The generic process flows of a Flexible Fuel Endex reactor are shown in FIG. 1 for five configuration embodiments 10, 20, 30, 40 and 50. Embodiments 10, 20, 30 and 40 illustrate how a single reactor 110 can be configured for different fuel streams and different product fuel streams, while embodiment 50 illustrates how a pair of Flexible Fuel Endex reactors 120, 130 can be configured in series for additional flexibility. These processes show the gas flows only, and do not include either the ancillary systems or the inputs and outputs of solid sorbents or catalysts, as described below. Also, the uses of various solid fuels such as coal of various ranks, biomass or waste to produce the input Syngas or Hydrogas are not explicitly shown. It is noted that a Flexible Fuel Endex reactor can advantageously operate with any of the inputs as shown in embodiments 10, 20, 30 and 40 with a transition time between the input fuels determined by the time to establish the new steady state in the Flexible Fuel Endex reactor(s) (110, 120, 130). From the detailed description of an embodiment of the Flexible Fuel Endex reactor, with the process flows shown in FIG. 2, it will be demonstrated that the Flexible Fuel Endex reactor acts as a gas switch. Further, the Flexible Fuel Endex reactor is able to operate on a mixture of the fuel inputs shown in embodiments 10, 20, 30 and 40, and can operate over a wide range of gas compositions covered by Syngas, Hydrogas, NG and SNG. These fuel gas streams are characterised by different amounts of methane, other hydrocarbons, hydrogen and carbon monoxide as the combustible components, and steam, $CO_2$ and other inert components as the non-combustible components. The temperature, pressure and compositions of these fuel gases depend on the method of their preparation. The gas streams may, or may not, include sulphur and other undesirable gases. These minor constituents are preferably be scrubbed from the input gases before injection. The input pressure is preferably in the range of 15-40 bar and the input temperature is preferably in the range of 400-900 C. For example, if input gas switching configurations for the production of hydrogen are considered, it is preferable that the input gas pressure is the same for both streams and the mass flow rates adjusted to give a constant Calorific Value in the hydrogen gas stream. For applications as a fuel for power generation using gas turbines, the Wobbe Index may also be adjusted by the excess steam in the hydrogen gas stream.

The Flexible Fuel Endex reactor(s) (110, 120, 130) preferably generates any process heat required for the chemical reactions that occur in the reactor by combustion of either the input or the output fuel gas stream preferably with air. The process heat includes that required for ancillary heat exchangers and possibly for the generation of electricity from steam or gas turbines. The combustion of an input fuel gas for process heat generates a flue gas with carbon emissions, whereas the combustion of a decarbonised gas stream generates a smaller amount of carbon emissions. A hydrogen gas stream combusts with negligible carbon emissions, associated with incomplete carbonation.

In embodiment 10 of FIG. 1, the input fuel gas stream is Syngas 112 which may be produced from a Partial Oxidation Gasifier, and the output is a hydrogen fuel gas stream 116. In embodiments 20 and 30, the input fuel gas steam is Hydrogas 122, 132, which is used to produce either a methane or a hydrogen fuel gas stream 126, 136 respectively.

In embodiment 40, the input fuel gas is NG or SNG 142 to produce a hydrogen fuel gas stream 146. In each embodiment, steam 114, 124, 134, 144 is used to induce the chemical reactions that produce $CO_2$ in the reactor, which is extracted as a $CO_2$ gas stream 118, 128, 138, 148. In embodiments 10, 30 and 40 the output gas stream is a hydrogen gas stream, in which decarbonation is essentially complete (with a typical 90% capture efficiency), whereas in embodiment 20 the output fuel gas is methane 126, in which case the decarbonation is typically about 45%. The details of these reactions are considered below.

In embodiment 50, a pair of Flexible Fuel Endex reactors 120, 130 is used in series to process Hydrogas 152 with the first reactor 120 producing a methane gas stream 156 with partial decarbonation, while the second reactor 130 produces a hydrogen fuel gas stream 166, thereby completing the decarbonation. In this configuration, the output may be methane 156 from the first reactor 120 and/or hydrogen fuel gas 166 from the second reactor 130. By contrast, embodiments 20 and 30 use a single reactor to process Hydrogas 122, 132 to either of these gas streams. The different outputs 126, 136 of configurations 20 and 30 are controlled by the amount of the steam input, the presence of different catalysts, and by the provision of external heat. The flexibility of embodiment 50 is that the reactors can be physically separated, over hundreds of kilometers with transport of methane being through an NG pipeline. It would be appreciated that, in this case, the same gas would be unlikely to be used in the second reactor if the pipeline was part of a NG distribution system. Rather, the process would work through supply and outtake (indicated as NG stream 162) agreements with the NG pipeline operator, for example with the requirement that the SNG input to the pipeline meets the same specification as the input NG.

In order to accomplish the above processes of embodiments 10, 20, 30 and 40 in a single reactor, each of the processes described above advantageously involve reactive decarbonation. That is, the input fuel gas streams generally contain very little $CO_2$, and the $CO_2$ is produced from CO either in the input gas, as in a Syngas input, or produced by steam reforming of methane as in a Hydrogas input. It is understood in the art that the basic gas phase chemical reactions that enable such transformations leading to decarbonation are active in the region of 600-900 C, so that the $CO_2$ capture process preferably operates in this regime.

The primary reactions that occur in the reactors are the Water-Gas Shift reaction (WGS) in embodiments 10, 20 and 50 (reactor 120), and the WGS and Steam Reforming reactions (SR) in embodiments 30, 40 and 50 (reactor 130). These reactions are $$CO+H_2O \rightarrow CO_2+H_2 \text{ Water Gas Shift}$$

$$CH_4+H_2O \rightarrow CO+3H_2 \text{ Steam Reforming}$$

In the case of Hydrogas 122 and 132, NG and SNG 142 inputs, both reactions occur, whereas in the case of Syngas 112 input, only the WGS reaction occurs. These reactions occur at high temperatures in the range of 600-1000 C, generally in the presence of a solid state catalyst.

Hydrocarbons in the fuel gas may also react with steam to form $CO_2$, e.g. with a stoichiometry of $CH_4+2H_2O=CO_2+4H_2$. That is, the steam can react with hydrocarbons in the fuel gas to produce either or both of carbon monoxide and $CO_2$.

These reactions do not separate the $CO_2$, but that separation is accomplished by the injection of a $CO_2$ sorbent, such as lime (CaO) or dolime (CaO.MgO), which extract the $CO_2$ as a solid carbonate, for example as calcium carbonate $CaCO_3$. The net effect is that the adsorption of $CO_2$ by the solid CaO particles enhances the formation of hydrogen through shifting the equilibrium of both the WGS and SR reactions according to LeChatalier's principle through the gas decarbonation reaction, which, in the case of lime as a sorbent, is $$CaO(s)+CO_2 \rightarrow CaCO_3(s) \text{ Gas Decarbonisation}$$

The net reactions are $$CO+H_2O+CaO(s) \rightarrow CaCO_3(s)+H_2 \text{ Sorbent Enhanced Water Gas Shift}$$

$$CH_4+2H_2O+CaO(s) \rightarrow CaCO_3(s)+4H_2 \text{ Sorbent Enhanced Steam Reforming}$$

The Sorbent Enhanced WGS process, SEWGS, has been described by S. Y. Lin, M. Harada, Y. Suzuki and H. Hatano, "$CO_2$ separation during hydrocarbon gasification", Energy, 30, 2186-2193 (2005) and S. Y. Lin, M. Harada, Y. Suzuki and H. Hatano, "Process analysis for hydrogen production by Reaction Integrated Novel Gasification (HyPr-RING)", Energy Conversion and Management, 46, 869-880 (2005). The SEWGS process with hydrotalcites is described by P. D. Cobden, "High Capacity Hydrotalcites" IEA Solid Network Looping Conference in Oviedo September 2009. The Sorbent Enhanced SR reaction, SESR, is described by Balasubramanian, B.; Ortiz, A. L.; Kaytakoglu, S.; Harrison, D. P. "Hydrogen from methane in a single-step process", Chem. Eng. Science, 1999, 54, 3543-3552 and Ding, Y.; Alpay, E. "Adsorption-enhanced steam—reforming", Chem. Eng. Science, 2000, 55, 3461-3474. While the SESR and SEWGS reactions are well understood, the conditions for their application to flexible decarbonation as described herein has not previously been described. Conventional carbon capture systems, such as amine or proprietary solvent technologies, cannot operate in this temperature regime and are intolerant to the reactive species in fuel gas streams at these temperatures.

Minor hydrocarbon constituents in the fuel gas may be also be reformed by steam to hydrogen and carbon dioxide. Steam reforming of methane initially produces carbon monoxide, which is then transformed to carbon dioxide and additional hydrogen by the WGS reaction. In Sorbent Enhanced WGS (SEWGS) and Sorbent Enhanced SR (SESR), decarbonation of the gas causes the WGS and SR reactions to produce additional hydrogen, thereby driving the reactions to completion. The thermodynamics of these reactions are understood, with the WGS reaction being slightly exothermic with a heat of reaction −41.2 kJ mol$^{-1}$, the SR reaction being strongly endothermic with 165.0 kJ mol$^{-1}$, and the decarbonation reaction being strongly exothermic with −179.6 kJ mol$^{-1}$. The kinetics of these reactions are understood, and both the WGS reaction and the SR reactions are generally too slow below 1000 C, and are catalysed by a solid catalyst. At temperatures of about 850 C, the catalyst most after used is a mixed valence iron oxide, which is known to catalyse both reactions. In most WGS reactor designs, the iron oxide sinters and its catalytic activity is lost. Low temperature WGS reactors use a more powerful catalyst such a nickel. In commercial WGS and SR reactors, the catalyst is held in the reactors by being supported on various substrates that remain in the reactor.

The introduction of lime, CaO, as a sorbent for the SEWGS and SESR reactors in the desired range of 600-900 C, has been studied. The sorbent, when loaded with $CaCO_3$, is transported to a Calciner reactor in which the sorbent, CaO is regenerated and the $CO_2$ is released as a pure gas stream, which is cooled and compressed, through the calcination reaction $CaCO_3 \rightarrow CaO(s) + CO_2$ Calcination The overall process of cycling the sorbent between a Gas Decarbonation (or Sorbent Carbonation) reactor and a Calcination reactor is called Calcium Looping or Calcium Oxide Looping initially described by Temminck and Heesink (PCT WO94/01203 4994) for $CO_2$ capture from flue gas, and $CO_2$ capture from a Water Gas Shift reactor for a fuel gas.

The major impediment to the SEWGS process at about 850 C is associated with three fundamental properties of the CaO sorbent, namely the sintering of the CaO particles at these temperatures and pressures, the attrition of the CaO particles, and the irreversible reaction of CaO with volatile sulphur compounds, if present, such as $H_2S$ and COS to form CaS, and the reaction with volatile chlorides, if present, to produce $CaCl_2$. The sintering occurs by thermal sintering catalysed by both $CO_2$ and $H_2O$ above 900 C, and reactive sintering above about 10% sorbent carbonation. If the rate at which the sorbent has to be replenished is very high, as result of cumulative formation of CaS, sintering or attrition, then there is an energy penalty because the CaO sorbent is first manufactured by calcination of limestone, $CaCO_3$. This production process consumes energy and produces $CO_2$. The Zero Emissions Coal process (J. Ruby, A. Johnson, H. Ziock and K. Lackner, *Proceedings of 21$^{st}$ International Technical Conference on Coal Utilization and Fuel Systems*, Clearwater, Fla., 4-7, March 767 (2002)) considers the production of methane using lime, but an efficient means of separating the $CO_2$ was not established.

Sceats, in "System and method for Processing Flue Gas" (PCT/AU2009/000613) describes an efficient means of $CO_2$ separation for flue gas. The contents of PCT/AU2009/000613 are hereby incorporated by cross-reference, and will not be restated in all aspects herein. That work describes a configuration of sorbent Carbonation and Calcination reactors, called the Endex configuration, in which the $CO_2$ separation can be achieved with negligible additional energy. This is achieved by thermally coupling the reactors so that they operate as a coupled pair with one reactor operating exothermically (the Carboniser) and the other operating endothermically under steady state conditions in which the heat from the exothermic reactor flows spontaneously to the endothermic reactor. By controlling the $CO_2$ exhaust pressure the temperature of the Calciner is set to be lower than that of the Carboniser, such that this condition is achieved. An advantage of the Endex configuration is that the thermal sintering of CaO is minimised by the low calcination temperature and the reactive sintering is minimised by the ability to operate the reactors efficiently with a low degree of carbonation. The heat transfer occurs through the walls of the reactor, or sorbent transfer or a combination of both. Thus both the sorbent and the energy are recycled in the reactor system. For $CO_2$ separation from flue gas, the energy for sorbent carbonation is equal to the energy of calcination, so that preferably no additional energy is required, other than for parasitic energy losses, such as radiative heat loss.

The example system and method embodiments herein describe the application of Endex principles to the decarbonation of fuel gas streams to produce a decarbonated, or partly decarbonated, fuel gas steam and a compressed $CO_2$ stream from the Flexible Fuel Endexreactor. The embodiments of FIG. 1 each use a high temperature $CO_2$ sorbent looping to achieve the decarbonisation of the fuel gas. The sorbent is generally limestone, although other high temperature looping sorbents such as dolime CaO.MgO may be used. The embodiments also include catalysis of the reactions, which may be accomplished by iron oxide or other catalysts, in either the form of particles that are looped with the $CO_2$ sorbent, or as supported catalysts that are held/supported in the reactor where the catalyst is required. Limestone can be found that comprises $CaCO_3$ and Iron Oxide as constituents in the ground particles, so the sorbent lime particles contain the catalyst in one embodiment. Or, if the lime sorbent is made in a process such as from a precipitate of $Ca(OH)_2$, then the catalyst can be added at that stage. That is, the solid catalyst can be supported in the decarboniser reactor, or mixed with the solid sorbent as separate particles, or incorporated into the solid sorbent. In embodiments using lime particles as the solid sorbent, the particles are preferably in the range of about 20-200 microns and the temperatures at the exhausts of the calciner and decarboniser are in the range of about 700-950° C.

The Flexible Fuel Endex reactor in example embodiment comprises in general three segments. The first segment is the Gas Decarboniser that decarbonises the input gas stream using the SEWGS or SESR reactions with a high temperature sorbent and which, through control of the coupling to the other segments and the steam content of the input gas stream, regulates the reaction of the fuel gas inputs to produce the required amounts of the fuel gas and $CO_2$-loaded solid sorbent streams. This reactor contains the catalyst, either supported and retained in the reactor, or transported with the $CO_2$ sorbent. The second segment is the Calciner that regenerates the sorbent and produces the $CO_2$ gas stream for compression and sequestration. The pressure of the $CO_2$ gas stream is used to control the extent of decarbonation in the Gas Decarboniser and is a preferably the means of controlling the extent of carbonation. The third segment is the Combustor which combusts a fuel to generate the process heat that is supplied to the Gas Decarboniser and the Calciner in proportions to control the operation of the reactor. These three reactor segments are coupled thermally so that heat can flow between them. The heat may flow through the common walls of the reactors, or may be transferred between the reactors, with the latter mechanism being able to regulate the amount of heat transfer and control the extent of the reactions in the Gas Decarboniser and Calciner segments as required. The temperature rise in the Gas Decarbonation reactor is preferably suppressed by the heat loss to the Calciner, where the temperature drop is also limited. In this invention, the application of the Endex reactor is extended to the case for fuel gases in which there is one or more chemical reaction of the fuel gas in the Gas Decarboniser segment of the Endex reactor. This configuration is called the Flexible Fuel Endex reactor herein. In the specific case of interest, the predominant chemical reactions are the WGS reaction of CO with steam, and the SR reaction of methane with steam.

The presence of the chemical reactions generally requires process heat, which is explicitly provided in regulated amounts from a separate Combustor segment, explicitly as a means of controlling the desired reactions. In the Endex reactor, the $CO_2$ separation from flue gases is controlled through regulation of the $CO_2$ exhaust gas pressure for constant inputs. In the Flexible Fuel Endex reactor, the chemical composition of the fuel gas output stream and the extent of carbon capture through regulation of the $CO_2$ exhaust gas pressure as well as the steam input, and the heat transfers from the Combustor segment to each of the Gas Decarboniser and Calciner segments, control the $CO_2$ separation.

Figure 2:
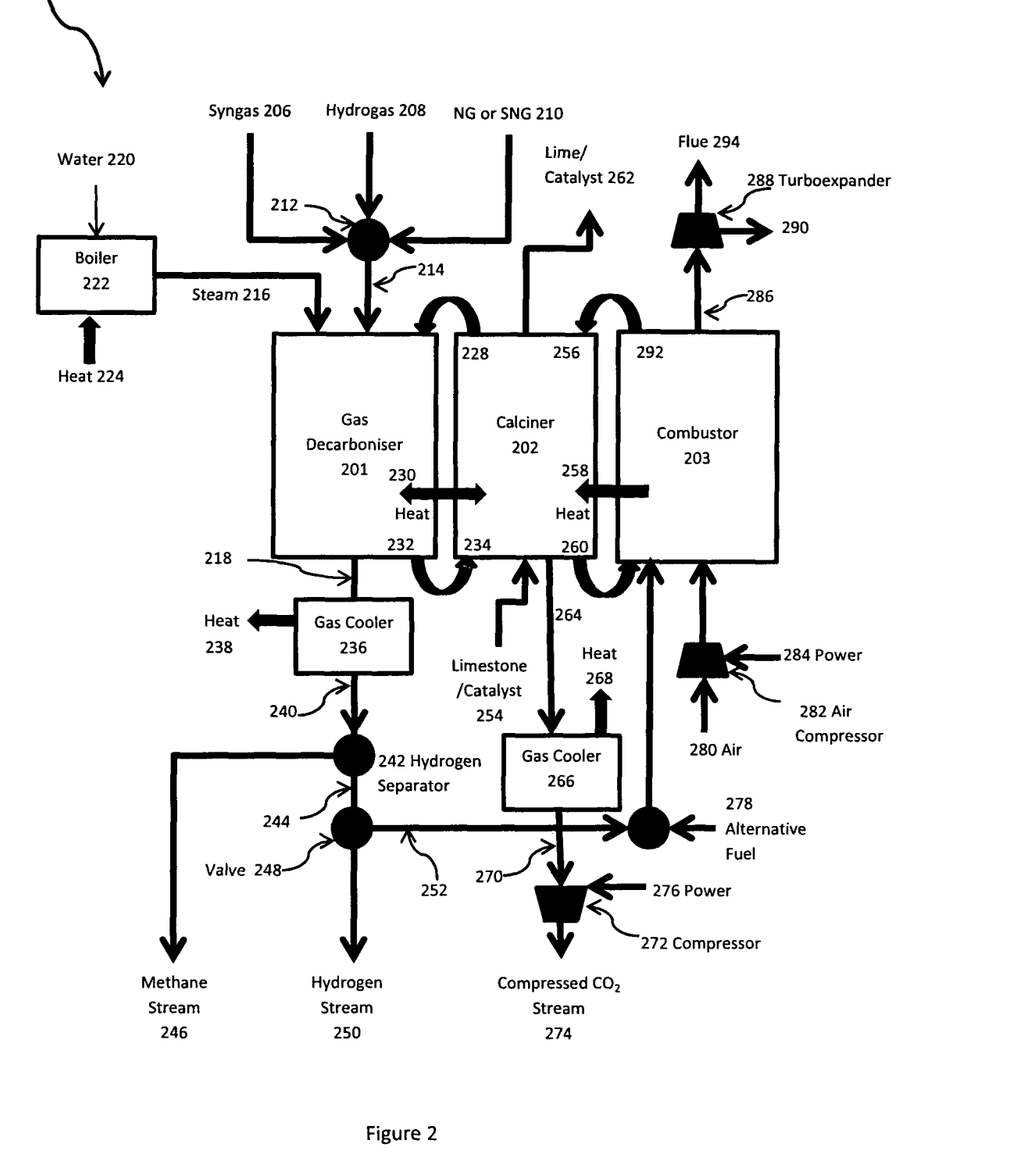
FIG. 2 shows a schematic drawing illustrating a process flow and reactor system for a Flexible Fuel Endex reactor according to an example embodiment.

FIG. 2 shows a WGS Flexible Fuel Endex reactor 200 embodiment in which the heat is transferred between three reactor segments, the Gas Decarboniser 201, the Calciner 202 and the Combustor 203. The inputs to the reactor are Syngas 206, Hydrogas 208 and NG/SNG 210. These are the input fuel gas stream options considered in FIG. 1. The input can be selected by a gas valve system 212 which can be used to select or mix the fuel gas streams, taking account of the temperature and pressure of each of the input gas streams. The resultant gas stream 214 is injected into the Gas Decarboniser segment 201 along with steam 216. The mass flow rates, temperature, pressure and heat exchanges into this segment are used to control the extent of the SEWGS and SR reactions. For example, the SESR reaction is slightly exothermic with a heat of reaction of $-14.6$ kJ mol$^{-1}$ so that the heat generated is relatively small to achieve equilibrium. On the other hand, the SEWGS reaction is highly exothermic with a heat of reaction of $-220.8$ kJ mol$^{-1}$ so that the heat generated is relatively large. Some of the heat generated can be used to heat the input gas streams 214 and 216. The means of controlling the heat transfers to give the desired output fuel gas stream 218 is considered below.

The steam input 216 is generated by heating water 220 in a boiler 222, which requires process heat 224. The sorbent input 226 to reactor 201 comprises a flow 228 from the Calciner 202 segment. There may be an heat transfer 230 through the walls between the Gas Decarboniser 201 and the Calciner 202 segments and a heat transfer (not shown) between the Gas Decarboniser 200 and Combustor 203 segments. The direction of the former heat flow is determined by the overall Flexible Fuel Endex reactor 200 steady state, whereas the combustor 203 will generally be at a higher temperature than either of the other reactor segments 201, 202. The sorbent exhaust 232, now loaded with $CO_2$ is transferred 234 to the Calciner 202 segment for regeneration. The fuel gas output 218 is cooled in a Gas Cooler 236 and heat 238 is extracted as required for the specified application of the flue gas stream 240. In some applications, the hot pressurised output flue gas stream 240 is directly injected into an industrial process, for example, for the production of electrical power. In other applications, the hydrocarbon and hydrogen components are separated in the hydrogen separator 242 to yield a hydrogen rich gas stream 244 and a methane rich gas stream 246 (i.e. essentially SNG). Any excess steam in the output 240 may be condensed from the gas stream 240 as water (not shown), and recycled. The hydrogen rich gas stream 244 may be separated by a valve 248 into two streams, a product stream 250 and a process fuel gas stream 252 for combustion, if required, in the Combustor segment 203.

In the Calciner segment 202, a solids feed 254 of fresh limestone particles and a catalyst is introduced to replenish the sorbent and catalyst. In this embodiment, the catalyst may be disposable, low cost iron oxide particles. In other embodiments, the catalyst may be supported in the reactor or may be found as desirable components in the mineral limestone feed. In the case of SEWGS, both CaO and MgO are understood to act as catalysts in the temperature regime of interest. The Calciner reaction is endothermic and requires $+179.6$ kJ mol$^{-1}$ of heat independently of whether the $CO_2$ was generated SEWGS or SESR net reactions. This heat is primarily obtained by heat transfer from the Gas Decarboniser 201 for SEWGS or the Combustor 203 for SESR. This heat is obtained from the wall heat transfers 230, 258, and the sorbent flows 228, 254, 256, 234, 260 and 262. The spent sorbent/catalyst 262 is exhausted from the Calciner 202, and heat may be extracted from this stream and used to preheat the input sorbent/catalyst 254. The major control parameters of the system 200 are (a) the setting of the pressure of $CO_2$ in the Calciner 202 exhaust, (b) the control of the thermal energy released in the Combustor 203 and (c) the mass flow rates of the sorbent between each of the reactors. The $CO_2$ product stream 264 is cooled in a Gas Cooler 266 with the liberation of heat 268 and the cooled $CO_2$ stream 270 is compressed in a compressor system 272 to give a compressed $CO_2$ fluid stream 274 appropriate for transport and sequestration through the application of power 276.

The Combustor segment 203 uses either the hydrogen slip stream 252 or an alternative fuel 278, which may be the one of the input fuel gas streams of Syngas 206, Hydrogas 208, NG or SNG 210, to produce the process heat required. The use of hydrogen for combustion in air 280 generates a low carbon emissions flue 290, whereas the use of one of the other input streams produces a flue gas with significant $CO_2$. For the SEWGS reactions, the amount of heat required from Combustor 203 is small and arises from heat losses and the like, whereas for the SESR reaction considerable process heat is used to ensure that the endothermic Calciner's 202 thermal energy requirement of $+179.6$ kJ mol$^{-1}$ is met principally through heat transfer from the Combustor 203, whereas in the SEWGS reactor the Calciner 202 operates principally through heat transfer from the Gas Decarboniser 201. On this basis, it is evident that the spontaneous heat transfers will occur for both reactions when the Calciner 202 is at the lowest temperature. This is one differentiating feature of the Flexible FuelEndex configuration compared to other SESR and SEWGS reactor processes where the Calciner is at a higher temperature than the Gas Decarboniser. In such prior art, heat is generated by combustion within the Calciner of a fuel with oxygen to ensure that the exhaust gas is primarily $CO_2$ and steam. Oxygen generation is an expensive process. In the example embodiment, efficient thermal coupling of the reactors advantageously leads to an efficient decarbonation process. The design of the reactor 200 preferably takes account efficient heat transfer from the Calciner 202 segment to both the Gas Decarboniser 201 segment and the Combustor 203 segment. In order to scale the size of the reactors, it is preferable that the heat is transferred primarily by the sorbent.

Because the Gas Decarboniser 201 segment is at high pressure, there are mechanical design benefits if the Combustor 203 also operates at the high pressures of the Gas Decarboniser 201. In such an embodiment, the additional benefit of using high pressure combustion is that electrical power can be generated. The air input 280 is compressed by the compressor 282 with consumption of electrical power 284, heated in the Combustor 203 to give a hot flue gas 286 which is expanded in the turboexpander 288 to generate electrical power 290. Sufficient fuel can be combusted so that the electrical output 290 from expansion can meet the power demands of the air compressor 284 and the $CO_2$ compressor 276, and any other ancillaries used in the system 201, such as required for solids handling through pneumatic transport and lockhoppers. The heat transfer from the Combustor 203 segment to the Calciner 202 segment can be controlled by the transport of an amount of sorbent through the Combustor 203 from the Calciner 202 at 260, with the heated sorbent exhaust at 292 being recirculated into the Calciner 202 at 256. The flue gas 294 may be further cooled to extract heat for recuperation.

The degree of carbonation of the sorbent can advantageously be reduced to about 6% by using a high solids flow so that the effects of reactive sintering are reduced. The reduction of the temperature variation by such heat transfer means that the thermal sintering of the sorbent is reduced. However, the sorbent is typically still subject to attrition and sulphidation, and may be replenished periodically.

In the Flexible Fuel Endex reactor 200 of FIG. 2 embodying the present invention, the sorbent, and the catalyst if required, are recycled and the gas flows are continuous. Continuous flow reactors may be preferable in a production system. Continuous flow may also be preferable in the case in which the resultant fuel, e.g. hydrogen, is consumed continuously, for example, in a combustion process where flames are susceptible to variations in gas flow. It is recognised that ballast tanks and valves can be used to smooth the gas flow in such systems. The advantages of a sorbent flow system include that attrition is preferably removed as an issue, and the sorbent and catalyst replacement to make up for both sintering and sulphidation can be simply achieved by bleeding the materials in and out from the reactor. For the application in this embodiment, it has been recognised by the inventors that the majority of the input gas mass of steam and the fuel gas is captured by the sorbent as $CaCO_3$, and the low mass of the hydrogen gas left behind cannot lift the sorbent through the Gas Decarboniser. Therefore, the Flexible Fuel Endex reactor 200 shown in FIG. 2 is comprised of three downer segments 201, 202, and 203 with pneumatic transport by a hot gas used to lift the particle streams from each of the bases of the segments 201, 202 and 203 for injection into the throats of the receiver reactors.

The Flexible Fuel Endex system, such as that shown in FIG. 2, processes any of the input fuel gas streams, such as 206, 208, 210, or mixtures thereof, to produce the required output fuel gas streams such as 246, 250 and the $CO_2$ stream 274. If the input gas stream contains no methane then no methane would be produced, and if SNG or NG is a pure input, then the system operating conditions would logically preferably be controlled to consume the SNG/NG, so the methane output would be set to be negligible. That is, the operating conditions would be set by the controls described above to achieve one of the outcomes shown in FIG. 1.

In the Flexible Fuel Endex configuration, the need for external energy input is also advantageously minimised by organising the temperature of the Calciner 202 exhaust to be lower than the temperature of the Gas Decarboniser 201 exhaust so that heat spontaneously flows from the Gas Decarboniser 201 to the Calciner 202, and the energy is recycled. This can be achieved by controlling the $CO_2$ partial pressure. Similarly, In the Flexible Fuel Endex configuration, the Combustor 203 temperature is preferably set such that it is also higher than that of the Calciner 202 so that heat spontaneously flows from the Combustor 203 to the Calciner 202. This can be achieved by controlling the fuel gas 252 or 278 to air 280 mass flows. These heat flows spontaneously transfer energy from the hotter Gas Decarboniser 201 and Combustor 203 segments to the cooler Calciner 202 by both the wall heat transfer and the sorbent/catalyst heat transfer. If the sorbent flow rate can be made sufficiently high, then the reactors can be configured so that no heatflows through the walls are required. This means that the catalyst solids do not have to be supported in the reactor, but can move through the reactor entrained with the sorbent solids. The ability to readily replace the catalyst means that advantageously iron oxide particles, direct from a mine or as an impurity in the limestone if appropriate, can be used, therefore advantageously bypassing the need to pre-process the iron oxide with CuO. That is, both the CaO and iron oxide can be readily replaced if both are present as particles that are cycled between the two reactor segments.

It is preferable that the CaO sorbent particles are less than about 125 microns so that the calcination-carbonation reaction occurs uniformly within the particle at a fast rate that is not inhibited by gas and thermal transport. The catalyst particles may e.g. be in the range of 150-250 microns so that the sorbent and catalyst solids streams can be separated from the spent solids if required. A further advantage of the high solids flow is that only partial carbonation is required, and if this is kept to less than about 6% to minimise reactive sintering, each particle can preferably act as its own heat bath as it is transported between the reactor segments 201, 202 and the heat transfer through the walls can be minimised. Minimising the wall heat transfer can facilitate the scaling of the reactors to large systems. In the Flexible Fuel Endex reactor 200 in FIG. 2, the fast heat exchange between the particles is preferably such that the solid catalyst particles contribute to the heat transfer, and can facilitate the heat transfer between the reactor segments 201, 202 and 203.

The processing of the sorbent through the Combustor segment 203 has a number of secondary benefits. Firstly, the combustion can remove any carbon built up from the Boudouard side reaction on the sorbent and catalyst particles in the Gas Decarboniser segment 201, which may otherwise accumulate and impede the respective calcination/carbonation, WGS and SE reactions on the particle surfaces. Secondly, the Combustor 203 provides an oxidising environment whereas the Gas Decarboniser 201 is a reducing environment, so that the iron oxide catalyst can preferably be maintained in the mixed valence state oxidation state $FeO.Fe_2O_3$ of magnetite responsible for catalytic activity, by controlling the residence times in the respective reactors. It is noted that magnetite often occurs as an impurity mineral in limestone deposits, and with the preferable high solids loading in the Gas Decarboniser 200 the required catalytic activity may be obtained without the need to add separate magnetite particles. Should magnetite be added separately, residual magnetite particles may be separated from the spent sorbent stream by their magnetic properties and re-injected into the fresh sorbent stream.

The amount of fuel gas that is consumed in the Combustor 203 preferably provides sufficient heat for the chemical processes and to make up for the temperature losses of the Flexible Fuel Endex reactor 200 from parasitic radiative and conductive losses. The increase of the temperature of the sorbent particles in the Calciner 202 from the Combustor 203 heat is such that the temperature of the $CO_2$ in the Calciner 202 is increased, and the partial pressure of $CO_2$ is increased. The benefit of a higher $CO_2$ partial pressure is that the energy required to pump the $CO_2$ from the Calciner 202 is lowered.

The ability in preferred embodiments to continuously extract $CO_2$ from the fuel gas stream with minimal input of energy, while retaining the temperature of the primary gas stream at close to the optimum, is very significant for pre-combustion carbon capture not only because the net energy penalty is very small, but also because the gas can be made available continuously at high temperature and pressure for combustion in an Combined Cycle (CC) process to produce electricity. The Flexible Fuel Endex reactor allows for pre-combustion carbon capture for the Integrated Gasification Combined Cycle (IGCC) process for power generation in which Syngas is generally considered as the source of fuel gas from the solid fuel, although Hydrogas could be equally used to produce the fuel gas. The Flexible Fuel Endex reactor allows for pre-combustion carbon capture for the Natural Gas Combined Cycle (NGCC) process for power generation in which fuel gas is NG or SNG. This demonstrates the flexibility of the Flexible Fuel Endex reactor. From the perspective of an operator of a Gas Turbine system, the Flexible Fuel Endex reactor allows the Gas Turbine to be used with a variety of fuel sources, from coal to NG. Thus the large capital cost for a power plant is preferably not locked into a particular choice of fuels for the 20-30 year operating period of the plant.

The integration of a Flexible Fuel Endex reactor embodying the present invention into an IGCC stream is based on the observation that the hydrogen gas stream 250 in FIG. 2 is (a) at a high pressure required for gas turbines in the range of 30-40 bar; and (b) and the high temperature of the gas carries high thermal energy that is not required to be provided for by the gas turbine combustion and (c) the steam and inert gas content of the hydrogen gas stream are beneficial in the efficiency of the Gas Turbine. Because the energy in the input hydrogen gas stream has been generated by the low temperature processes in the Flexible Fuel Endex reactor, the amount of $NO_x$ generated in the Gas Turbine is considerably reduced. The expenditure of energy in the Combustor 203 is offset by the heat in the hydrogen gas stream, such that overall, there is negligible thermal efficiency loss in the overall electrical energy generated in the IGCC/NGCC process.

In one embodiment, lime (CaO) preferably produced from limestone ($CaCO_3$) is used as the inorganic salt which acts as a catalyst for various processes described herein, and as a $CO_2$ sorbent. In other embodiments, other materials such as magnesium oxide (MgO), dolime ($MgO.CaO$) or semi-dolime ($MgO.CaCO_3$) produced from magnesite or dolomite may be used. Other materials include catalysts such as potassium carbonate, sodium carbonate, ferrous nitrate, nickel (II) nitrate and ferrous sulphate.

Sceats and Horely (PCT/AU2007/000424), the contents of which are hereby incorporated by cross reference, describe a flash calciner in which steam is used to catalyse the production of CaO from $CaCO_3$, and that process may be adopted for the production of CaO for this application by separating the $CO_2$ from the steam by water condensation. In another embodiment, the CaO can be produced in a conventional kiln, with the $CO_2$ emissions from both the calcination and the combustion contributing to the carbon footprint of the overall process. The CaO production process preferably produces CaO with a high surface area to give fast reaction kinetics with $CO_2$ in the Flexible Fuel Endex reactor.

The spent sorbent/catalyst stream 262 contains primarily lime CaO. It is understood that lime can be injected into either a Hydrogasifier or a Partial Oxidising Gasifier to extract sulphur as CaS from the Hydrogas and Syngas streams. In respect of Hydrogas, the lime may have an additional benefit through its impact as a catalyst for hydrogenation of solid fuels.

In the following, embodiments of an energy generation network that utilize the natural gas distribution network are described to deliver fuel, as substantially methane, to power generation systems in which efficient $CO_2$ capture is carried out firstly at the source of generation of the methane from gasification of coal or biomass at or near the sources of these respective solids feedstock, or from the natural gas at or near the well head, and secondly at the source of generation of electrical power or other industrial process, so that a low $CO_2$ emissions process for energy use is established.

Figure 3:
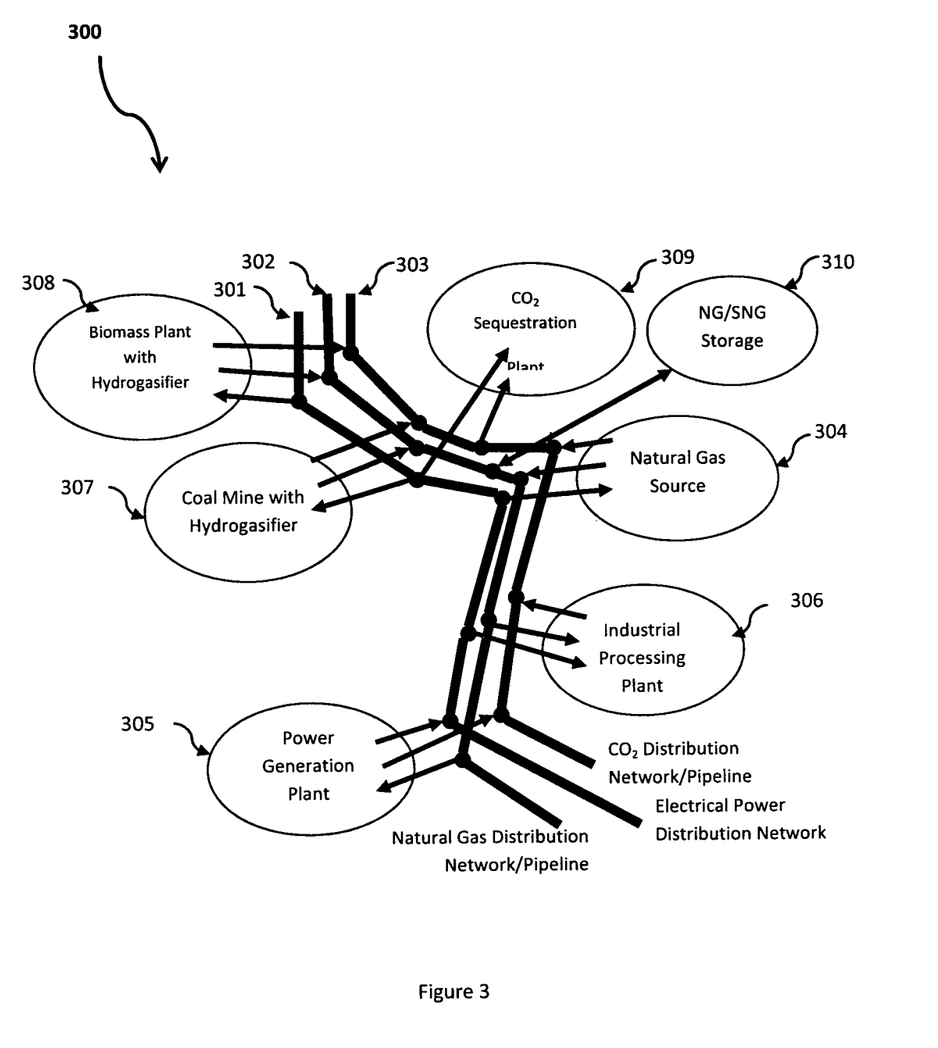
FIG. 3 shows a schematic drawing illustrating an energy distribution network comprising electrical power, NG/SNG pipelines and a $CO_2$ network/pipelines with nodes being sources of NG/SNG and users of NG/SNG, sequestration sites and NG/SNG sites, according to an example embodiment.

Referring to FIG. 3, an energy network 300 is comprised of an electrical power transmission and distribution network 301, a compressed NG pipeline network 302, which includes transportation of NG as Liquefied Natural Gas, and the low pressure delivery of natural gas to customers, and a carbon dioxide ($CO_2$) distribution network/pipeline 303, which may initially occur through the use of road tankers, barges or ships carrying compressed $CO_2$ or dry ice, which is solid $CO_2$. The roll out of pipelines for $CO_2$, is expected to occur where practicable as the demand for $CO_2$ capture and sequestration develops.

The NG network/pipeline 302 can be used to transport SNG provided that the specification for the composition and calorific value of SNG meets that of NG. The NG network 302 is fed from one or more NG sources 304 and the NG is delivered to one or more power plants 305, such as NG, NGCC or CHP gas turbine generators and industrial processing plants 306, which can include e.g. cement and iron and steel plants. Generally, the NG sources 304 are found in remote locations, whereas the power plants 305 and industrial processes 306 are located in or near metropolitan areas, to access people and in the case of electricity, preferably, to reduce power transmissions losses.

This NG network 302 can be supplied from SNG produced by, for example, hydrogasification of coal 307 or biomass 308. The coal in this context refers to any non-gaseous fossil fuels such as coal of various ranks, including lignite or peat, tar sands and oil shale. The hydrogasifiers for coal, tar sands or oil shale may be industrial plants, or the hydrogasification process may be carried out underground or undersea in the fossil fuel deposits. $CO_2$ is generated from a number of sources; from natural gas itself which contains $CO_2$ as an impurity; from the hydrogasification of coals and biomass; from industrial processes such as cement, lime, iron and steel, power generation and residential consumers. Generally, $CO_2$ capture from residential consumers is not viable. The $CO_2$ emissions from each of the other aforementioned users is of such a magnitude that they are expected to be subject to increasing regulations, taxes and permits in order to reduce mankind's $CO_2$ emissions.

An advantage of the energy network 300 is that the SNG/NG can be stored in large underground reservoirs 310, so the electrical power can be generated on demand without the requirement to turn down any SNG production plant. The NG/SNG reservoirs can advantageously be an important consideration for energy security.

Another feature of the energy network 300 described is that a medium to low calorific value fuel such as coal is preferably converted to a high calorific value fuel such as SNG at the site where the fuel is located, such as coal fields and biomass plantations. In the process described, about 50% of the carbon from the coal is captured as $CO_2$, and the remainder, predominantly in the form of methane, is transmitted as SNG to industrial or metropolitan centres via the NG/SNG network 302, where the remaining 50% of carbon can be captured. If each process has e.g. a 90% capture efficiency, then about 45% of the $CO_2$ capture occurs at the NG/SNG processing sites (104, 107, 108) and about 45% is captured in the end users sites. Each NG/SNG generator and each NG/SNG end user has, in principle, the opportunity of transmitting the separated $CO_2$ through the $CO_2$ transport network 303 for sequestration.

The enabling technology for the energy network 300 in an example embodiment shown in FIG. 3 is a $CO_2$ separation technology that has a high $CO_2$ capture efficiency which is affordable. Generally, $CO_2$ capture is preferably performed under high gas pressures as this typically lowers the cost because the smaller volumetric flow rates means a lower physical footprint, and because any $CO_2$ separation process will have a higher efficiency if the $CO_2$ is at a higher pressure than that produced in conventional atmospheric combustion systems. The energy network 300 employs pre-combustion $CO_2$ capture systems in which the $CO_2$ is extracted from the fuel source in two stages, firstly by the NG/SNG generator and secondly by the NG/SNG end user. The flexibility of the energy network 300 includes the ability to turn on or off the $CO_2$ capture processes to meet the demands and regulations. In most existing $CO_2$ capture technologies, the energy loss associated with the $CO_2$ capture plant is such that it would be preferable to bypass the $CO_2$ capture units, and turn them off if the demand or price for $CO_2$ was too low. However, the stability of large scale processing plants is such that they are difficult to ramp and down, and this process can take hours to days.

On the other hand, the Flexible Fuel Endex reactor, including as described above with reference to FIGS. 1 and 2, have a sufficiently low thermal energy penalty such that there is no advantage in turning off the $CO_2$ separation process if the demand or price for $CO_2$ was too low. Rather, the $CO_2$ can be advantageously stored locally for later transmission for sequestration, or can be vented, or otherwise deployed in other industrial processes.

The energy network 300 preferably has the following features:— a. The capture system for the removal of $CO_2$ for the NG/SNG production should be able to be operated at any level of the turndown of the NG/SNG production process, and is not the determining factor in the ramp up/ramp down of the NG/SNG production process. The penalty for $CO_2$ capture in this process is low so that the production of NG/SNG is decoupled from the economics of carbon sequestration.

b. The end user capture system for the removal of $CO_2$ from, e.g. the power generation system operates with a small energy penalty such that its output would be used in the gas turbine power unit independently of whether or not $CO_2$ capture was required for regulatory or financial reasons. That is, if $CO_2$ sequestration is not warranted or required, the only operational decision to be made is whether or not to vent the $CO_2$. In general, it is not possible to run a gas turbine optimally with any fuel and a turbine is generally optimised and run on a single fuel composition. This is set, for example, by the Wobbe Index of the fuel. While multiburner gas turbine systems may obviate this necessity, it is preferable that the gas composition is maintained independently of the need for hydrogen production.

Figure 4:
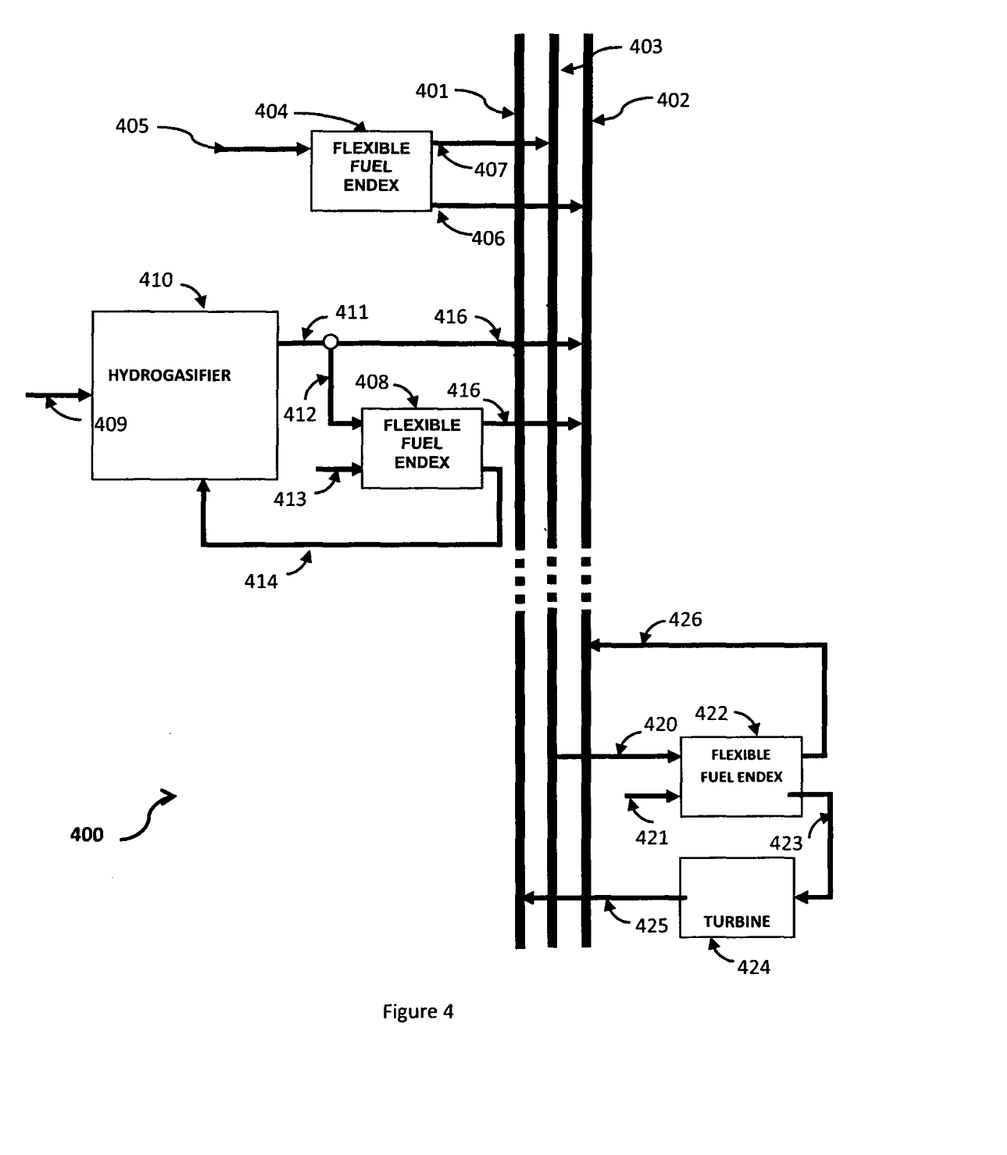
FIG. 4 shows a schematic drawing of a process in which a number of Flexible Fuel Endex reactors are deployed to (a) extract $CO_2$ from a solid fuel to produce SNG a pure natural gas steam, (b) extract $CO_2$ in a coal-to-methane generator at or near a mine site, or a biomass-to-methane generator at or near a biomass source, and (c) extract $CO_2$ from the natural gas/synthetic natural gas stream in the production of hydrogen for low emissions industrial processes including the generation of energy, according to an example embodiment.

In FIG. 4, the use of the Flexible Fuel Endex reactors in the energy network 400 are shown explicitly in the three roles in a system where the three networks for power 401, NG/SNG 402 and $CO_2$ 403 are shown. In the first Flexible Fuel Endex reactor 404, an input stream of NG, 405, from a well-head source is injected into the reactor which separates the $CO_2$ 406 from the methane 407, and each gas stream is injected into the respective pipeline 403, 402 respectively. The steam content of the well head gas is preferably low or the fuel is dried, so that the steam reforming reaction is quenched such that the methane in the gas stream is not converted to hydrogen. Nevertheless, a small amount of hydrogen preferably ensures that carbon deposits are not formed in the reactor. In this first Endex reactor 604, the lime sorbent (not shown) extracts the $CO_2$ from the gas stream. It would be appreciated by a person skilled in the art that the lime also preferably removes sulphur through sulphidation to form CaS, which can be later oxidised to form gypsum.

The second Flexible Fuel Endex reactor 408 is used to drive the generation of hydrogen from methane for the gasification of coal or biomass feedstock 409 in the hydrogasifier unit 410. The hydrogasifier 410 produces a gas stream 411 which is substantially methane. A part of this gas stream 412 in injected into the Flexible Fuel Endex reactor 408 with steam 413 so that the steam reforming reaction generates sufficient hydrogen 414 for the hydrogasifier. The other part of the methane gas stream 415 is injected into the NG/SNG pipeline 402, and the $CO_2$ stream 416 from the Flexible Fuel Endex reactor is injected into the $CO_2$ network/pipeline 403. It would be appreciated by a person skilled in the art that the lime (not shown) in the Flexible Fuel Endex reactor also preferably captures sulphur from the output of the gasifier. The spent CaO sorbent can be used in a guard bed so remove the sulphur from the methane gas stream 415.

The first two Endex reactors 404, 408 demonstrate that $CO_2$ removal from NG, coal, tar sands, oil share or biomass can be accomplished in the production of methane. In the first case, the $CO_2$ is removed as an impurity in the gas stream as a part of the gas clean-up process, while in the second case the $CO_2$ is removed in the conversion of coal or biomass to methane. Typically this means that the Endex reactor operating with an efficiency of about 90%, will remove about 45% of the carbon in the feedstock, with the remainder of the carbon being in the methane gas. In FIG. 4, the methane from these two sources is injected into the NG/SNG pipeline 402. The NG/SNG is extracted by an end user as an energy source. The combustion of methane advantageously produces about 50% less $CO_2$ for the same thermal energy than coal or biomass, depending on the composition of the feedstock. The system 400 preferably lowers the emissions by 45% or more from the use of the feedstock as a fuel.

Notwithstanding this benefit, users of NG/SNG will be under regulatory pressure to reduce their $CO_2$ emissions. Post combustion capture of $CO_2$ from gas turbines is generally too difficult because of the very low partial pressure of $CO_2$ in the gas turbine exhaust. However, the third Flexible Fuel Endex reactor 422 shown in FIG. 4 illustrates that the $CO_2$ can be captured by reacting the methane stream 420 with steam 421 to produce hydrogen 423 which is used as the fuel for a gas turbine 424 on hydrogen to produce power 425, which is transported into the electrical grid 401. The $CO_2$ stream 426 from the Flexible Fuel Endex reactor is injected into the $CO_2$ network/pipeline 403 for sequestration.

Figure 5:
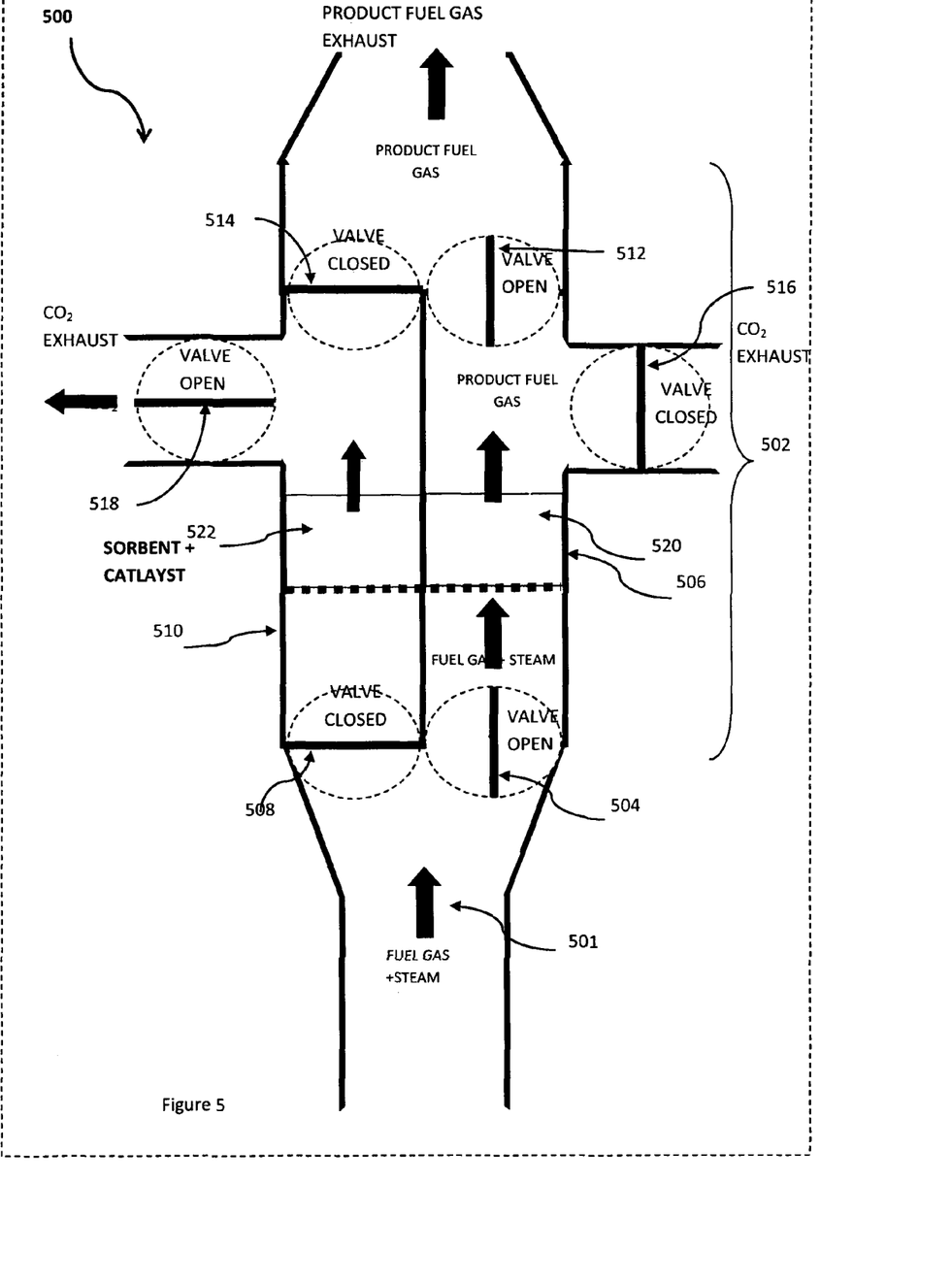
FIG. 5 is a schematic drawing showing another embodiment of a Flexible Fuel Endex reactor for implementing the generic process flow of FIG. 1 and for use in the energy distribution network of FIG. 3 and the process of FIG. 4.

FIG. 5 is a schematic drawing showing another embodiment of a Flexible Fuel Endex reactor 500 for implementing the generic process flow of FIG. 1 and for use in the energy distribution network of FIG. 3 and the process of FIG. 4. More particularly, the Flexible FuelEndex reactor 500 is based on gas switching. In this example embodiment, a fuel gas and steam input stream 501 is provided to an entrance of switchable Decarboniser and Calciner segments 510, 506 of a reactor system 502. In the Decarboniser segment 510, 506, either the WGS or the SR reactions proceed depending on the fuel gas and the heat transfers between the segments 510, 506 and a combustion source (not shown).

In a first switching configuration, an entry valve 504 into the first segment 506 of is in an open position, whereas an entry valve 508 into the second segment 510 is in a closed position. Similarly, an exit valve 512 of the first segment 506 is in an open position, while an exit valve 514 of the second segment 510 is in a closed position. Additionally, a $CO_2$ exhaust valve 516 of the first segment 506 is in a closed position, while a $CO_2$ exhaust valve 518 of the second segment 510 is in an open position. In this switching configuration, the first segment 506 functions as a decarboniser reactor for a first portion 520 of a solid sorbent and solid catalyst 520 disposed in the first segment 506 of the Flexible Fuel Endex reactor 500, while the second segment 510 functions as a calciner for a second portion 522 of a solid sorbent and solid catalyst 520 disposed inside the second segment 510.

It will be appreciated by a person skilled in the art that by periodically changing the switching configuration to reverse all of the valve positions in FIG. 5, the first and second segments 506, 510 of the Flexible Fuel Endex reactor 500 can function as either a decarboniser or a calciner for the respective first and second portions 520, 522 of solid sorbent and solid catalyst. It will be appreciated that in this embodiment, the heat exchange between the WGS Carboniser and the Calciner may be optimised, in as much as no physical transfer of the sorbent is required "between" the decarboniser and the calciner. In this embodiment, elements used for controlling the $CO_2$ partial pressures in the first and second segments 506, 510 have been omitted.

In one embodiment, the heating of the sorbent by the combustion process can be accommodated by switching the input stream 501 to a stream of combustion gas and air, or a hot flue gas from an external combustor, by valves (not shown), opening valves 508, 504, 516 and 518, closing valves 512 and 514 and switching the exhaust gases that pass through valves 516 and 518 from a $CO_2$ compression system to a flue stack by valves (not shown) so that the $CO_2$ stream is not contaminated by the flue gas. The process can be configured to be continuous by using two or more reactor systems 502 shown in FIG. 5 and switching the combustion gas between the two reactor systems. In another embodiment, the heating of the sorbent can be accommodated by external heat transfer through the walls of the reactor system 502 shown in FIG. 5, with the heating cycles to each segment 506, 510 timed to provide the heat required to sustain the respective reactions in the segments 506, 510.

Figure 6:
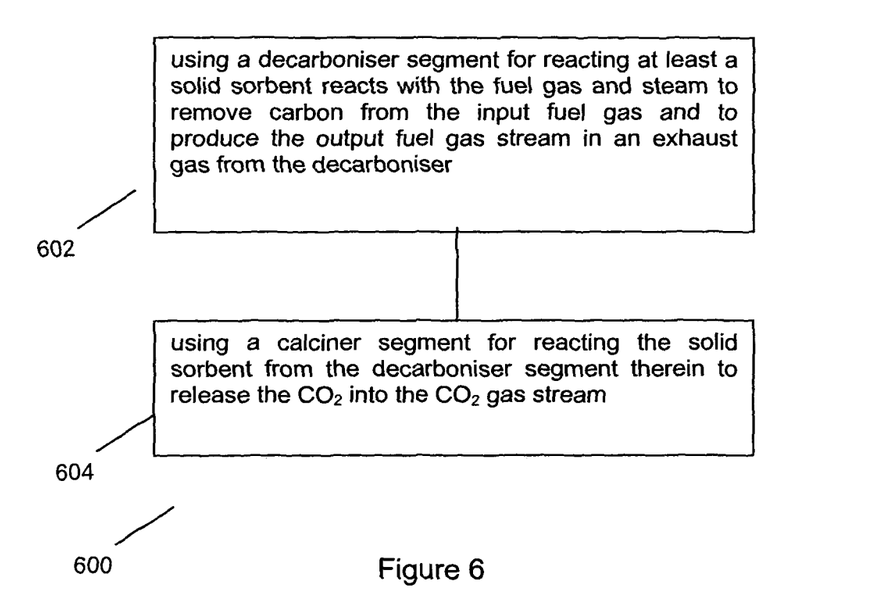
FIG. 6 shows a flowchart illustrating a method for processing an input fuel gas and steam to produce separate $CO_2$ and output fuel gas streams, according to an example embodiment.

FIG. 6 shows a flowchart 600 illustrating a method for processing an input fuel gas and steam to produce separate $CO_2$ and output fuel gas streams, according to an example embodiment. At step 602, a decarboniser segment is used for reacting at least a solid sorbent reacts with the fuel gas and steam to remove carbon from the input fuel gas and to produce the output fuel gas stream in an exhaust gas from the decarboniser. At step 604, a calciner segment is used for reacting the solid sorbent from the decarboniser segment therein to release the $CO_2$ into the $CO_2$ gas stream, wherein $CO_2$ partial pressures and temperatures in the decarboniser and calciner segments respectively are controlled such that the temperature in the decarboniser segment is higher than the temperature in the calciner.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. A method for processing an input fuel gas and steam to produce separate $CO_2$ and output fuel gas streams, the method comprising the steps of:
using a decarboniser segment for reacting at least a solid sorbent with the fuel gas and the steam to remove carbon from the input fuel gas and to produce the output fuel gas stream in an exhaust gas from the decarboniser;
using a calciner segment for reacting the solid sorbent from the decarboniser segment therein to release the $CO_2$ into the $CO_2$ gas stream;
wherein $CO_2$ partial pressures and temperatures in the decarboniser and the calciner segments respectively are controlled such that the temperature in the decarboniser segment is higher than the temperature in the calciner.

2. The method as claimed in claim 1, wherein, in the decraboniser, the steam reacts with the fuel gas, to produce $CO_2$ for adsorption by the solid sorbent.

3. The method as claimed in claim 2, wherein, in the decarboniser, the steam reacts with hydrocarbons that are present in the fuel gas to produce either or both of the carbon monoxide and the $CO_2$.

4. The method as claimed in claim 1, further comprising providing heat from the decarboniser to the calciner.

5. The method as claimed in claim 1, wherein the output fuel gas stream comprises hydrogen or methane.

6. The method as claimed in claim 1, wherein the input fuel gas comprises syngas, Hydrogas, Synthetic Natural Gas (SNG), or Natural Gas (NG).

7. The method as claimed in claim 1, further comprising providing a solid catalyst in the decarboniser segment to activate a reaction to produce the output fuel gas in the exhaust gas from the decarboniser.

8. The method as claimed in claim 7, wherein the solid catalyst comprises iron oxide.

9. The method as claimed in claim 7, wherein a particle size of the solid catalyst is larger than a particle size of the solid sorbent.

10. The method as claimed in claim 9, wherein the particle size of the solid catalyst equal to or larger than about 150 micron, and the particle size of the solid sorbent is less than about 125 microns.

11. The method as claimed in claim 1, further comprising using a combustor for providing additional heat to the calciner segment.

12. The method as claimed in claim 1, wherein the solid sorbent comprises lime particles.

13. The method as claimed in claim 12, wherein the lime particles are in the range of about 20-200 microns and the temperatures at the exhausts of the calciner and decarboniser segments are in the range of about 700-950° C.

14. The method as claimed in claim 1, further comprising feeding the output gas stream into a distribution network.

15. The method as claimed in claim 14, further comprising delivering the output fuel gas stream in the form of methane to a reactor configured for pre-combustion removal of $CO_2$ from the methane.

16. The method as claimed in claim 15, further comprising using the reactor configured for pre-combustion removal of $CO_2$ from the methane to generate separate Hydrogen and $CO_2$ streams from the methane.

17. The method as claimed in claim 1, further comprising feeding the $CO_2$ gas stream into a $CO_2$ gas distribution network.

18. The method as claimed in claim 17, further comprising using the $CO_2$ gas distribution network for delivery of the $CO_2$ gas stream for sequestration.

19. The method as claimed in claim 17, further comprising receiving an additional feed for the $CO_2$ gas distribution network from a reactor configured for pre-combustion removal of $CO_2$.

* * * * *